US008483130B2

(12) United States Patent
Wang et al.

(10) Patent No.: US 8,483,130 B2
(45) Date of Patent: Jul. 9, 2013

(54) DISCONTINUOUS TRANSMISSION IN A WIRELESS NETWORK

(75) Inventors: Min Wang, San Diego, CA (US); Ananthapadmanabhan Arasanipalai Kandhadai, San Diego, CA (US); Ravindra Patwardhan, San Diego, CA (US); Rashid Ahmed Akbar Attar, San Diego, CA (US); Yu-Cheun Jou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 434 days.

(21) Appl. No.: 12/628,824

(22) Filed: Dec. 1, 2009

(65) Prior Publication Data

US 2010/0165922 A1 Jul. 1, 2010

Related U.S. Application Data

(60) Provisional application No. 61/119,318, filed on Dec. 2, 2008.

(51) Int. Cl.
*H04W 40/00* (2009.01)

(52) U.S. Cl.
USPC .......................... 370/328; 370/338; 370/310.2

(58) Field of Classification Search
USPC ....................................... 370/328, 352, 395.5
See application file for complete search history.

(56) References Cited

U.S. PATENT DOCUMENTS

| | | | | |
|---|---|---|---|---|
| 6,347,081 | B1 | 2/2002 | Bruhn | |
| 6,707,821 | B1 * | 3/2004 | Shaffer et al. | 370/395.4 |
| 2001/0034601 | A1 * | 10/2001 | Chujo et al. | 704/233 |
| 2007/0064681 | A1 * | 3/2007 | Boillot et al. | 370/352 |
| 2007/0133479 | A1 | 6/2007 | Montojo et al. | |

FOREIGN PATENT DOCUMENTS

| | | | |
|---|---|---|---|
| JP | 10285212 | A | 10/1998 |
| JP | 2003018129 | A | 1/2003 |
| JP | 2005101709 | A | 4/2005 |
| JP | 2010525688 | A | 7/2010 |
| WO | 2008131530 | A1 | 11/2008 |

OTHER PUBLICATIONS

3GPP2 C.S0076-0 Version 1.0 3rd Generation Partnership Project 2, Discontinous Transmission (DTZ) of Speech on cdma2000 Systems. Dec. 2005 (5 pages).

International Search Report & Written Opinion—PCT/US2009/066389, International Search Authority—European Patent Office—Apr. 23, 2010.

* cited by examiner

*Primary Examiner* — Dang Ton
*Assistant Examiner* — Pamit Kaur
(74) *Attorney, Agent, or Firm* — Charles Chesney

(57) ABSTRACT

A communication system for use in a wireless network includes: an audio module configured to provide packets indicative of audio for a part of a communication between the communication system and another communication system, the communication spanning packet times, the packets including at least critical packets indicative of critical audio; and a transceiver coupled to the audio module and configured to cause: the critical packets to be conveyed for transmission; and first non-critical packets, indicative of non-critical audio, to be conveyed for transmission such that (1) the first non-critical packets represent less than all of a time between transmission of critical packets and (2) no more than a threshold number of packet times will pass without one of the critical packets or one of the first non-critical packets being conveyed by the transceiver for transmission.

31 Claims, 6 Drawing Sheets

110

| PKT No. | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| PKT Type | A | A | A | A | $E_C$ | B | B | B | B | B | B | B | B | $E_C$ | B | B | B | B | B |

112 112 114 116 116 114 116

FIG. 6A

120

| PKT No. | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| PKT Type | T | T | T | T | T | X | X | X | X | X | X | X | X | T | X | X | X | X | X |

122 122 124 122

FIG. 6B

130

| PKT No. | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| PKT Trans./ Type | T | T | T | T | T | X | X | X | D | X | X | X | D | T | X | X | D | X | X |

132 132 134 133 132 133

FIG. 6C

140

| PKT No. | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| PKT Trans./ Type | C<br>T | C<br>T | C<br>T | C<br>T | C<br>T | NC | NC | NC | NC<br>T | NC | NC | NC | NC<br>T | C<br>T | NC | NC | NC<br>T | NC | NC |

142 142 144 146 144 146

FIG. 6D

150

| PKT No. | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| PKT Trans./ Type | C<br>T | C<br>T | C<br>T | C<br>T | C<br>T | NC | NC | NC | NC<br>T | NC | NC | NC | NC<br>T | C<br>T | NC | NC | NC | NC<br>T | NC |

152 154 156 154 156

FIG. 6E

DISCONTINUOUS TRANSMISSION IN A WIRELESS NETWORK

CROSS-REFERENCES TO RELATED APPLICATIONS

This application claims the benefit of U.S. Provisional Application No. 61/119,318, filed Dec. 2, 2008, entitled "Methods for Discontinuous Transmission," which is incorporated herein by reference for all purposes.

BACKGROUND

Wireless communication systems are widely deployed to provide various communication services such as voice, video, packet data, messaging, broadcast, etc. These wireless systems may be multiple-access systems capable of supporting multiple users by sharing the available system resources, e.g., time, frequency, power. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of mobile terminals. The system may support operation on multiple carriers. Each carrier may be associated with a particular center frequency and a particular bandwidth. Each carrier may carry pilot and overhead information to support operation on the carrier. Each carrier may also carry data for terminals operating on the carrier. Some transmissions between a terminal and a base station may cause interference to, and may also observe interference from, other transmissions in the communication system. The interference may adversely impact the performance of all affected base stations.

Typically, in two-way conversations, each party speaks for sometime during which a communication system transmits the party's speech (e.g., less than half of the time) and pauses for other times during which the communication system transmits silence or background noise. Infrequent transmission or discontinuous transmission (DTX) during the silence (or background noise) period has little impact on the perceptual quality of the conversation but provides the benefits of reducing inter-/inter-cell interference (therefore potentially increasing the system capacity) and conserving the battery power of a mobile unit used for the conversation.

A typical DTX scheme is realized by a speech encoder that uses voice activity detection (VAD). Using VAD, the encoder can distinguish active speech from background noise. The encoder encodes each active speech segment (typically 20 ms long) with a target bit rate packet for transmission and represents critical background noise segments (again 20 ms long) with a relatively small size packet. This small packet may be a silence descriptor (SID) indicating silence. A critical background noise segment might be the background noise segment that immediately follows a talk spurt, or a background noise segment whose characteristics are significantly different from its precedent noise segments. Other types of background noise segments (or non-critical background noise segments) are denoted with 0 bits, or blanked, or not transmitted, or suppressed from transmission. Because the pattern of output packets (namely active segment(s) then critical background noise segment(s) then non-critical background noise segment(s)) purely depends on the input of the speech encoder, or the source, such a DTX scheme is called a source-controlled DTX scheme.

SUMMARY

An exemplary communication system according to the disclosure for use in a wireless network includes: an audio module configured to provide packets indicative of audio for a part of a communication between the communication system and another communication system, the communication spanning packet times, the packets including at least critical packets indicative of critical audio; and a transceiver coupled to the audio module and configured to cause: the critical packets to be conveyed for transmission; and first non-critical packets, indicative of non-critical audio, to be conveyed for transmission such that (1) the first non-critical packets represent less than all of a time between transmission of critical packets and (2) no more than a threshold number of packet times will pass without one of the critical packets or one of the first non-critical packets being conveyed by the transceiver for transmission.

Embodiments of such a communication system may include one or more of the following features. The audio module is configured to provide the first non-critical packets to the transceiver, and wherein the first non-critical packets represent actual audio of the communication between the communication system and the another communication system. The audio module is configured to provide the critical packets, the first non-critical packets, and second non-critical packets, indicative of non-critical audio, and the transceiver is configured to inhibit the second non-critical packets from transmission. The audio module is configured to provide an indication of whether a provided packet represents critical or non-critical audio. The audio module is configured to provide to the transceiver only the critical packets and the first non-critical packets. The audio module is configured to provide only the critical packets to the transceiver and the transceiver is configured to generate the first non-critical packets. The transceiver is configured to ensure that every $P^{th}$ packet in the communication is conveyed for transmission. The transceiver is configured to determine whether a present packet is a $P^{th}$ packet of the communication only if the present packet is a non-critical packet.

Another exemplary communication system according to the disclosure for use in a wireless network includes: an audio module configured to provide packets indicative of audio for a part of a communication between the communication system and another communication system, the communication spanning communication packet times, the packets including at least critical packets indicative of critical audio; and transmitting means coupled to the audio module for transmitting: the critical packets; and first non-critical packets, indicative of non-critical audio, such that (1) the first non-critical packets represent less than all of a time between transmission of critical packets and (2) no more than a threshold number of packet times will pass without one of the critical packets or one of the first non-critical packets being conveyed by the transceiver for transmission.

Embodiments of such a communication system may include one or more of the following features. The audio module is configured to provide the first non-critical packets to the transceiver, and wherein the first non-critical packets represent actual audio of the communication between the communication system and the another communication system. The audio module is configured to provide the critical packets, the first non-critical packets, and second non-critical packets, indicative of non-critical audio, and the transceiver is configured to inhibit the second non-critical packets from transmission. The audio module is configured to provide an indication of whether a provided packet represents critical or non-critical audio. The audio module is configured to provide to the transceiver only the critical packets and the first non-critical packets. The audio module is configured to provide only the critical packets to the transceiver and the transceiver is configured to generate the first non-critical packets. The transmitting means is further for ensuring that every $P^{th}$ packet in the communication is conveyed for transmission. The transmitting means is configured to determine whether a present packet is a $P^{th}$ packet of the communication only if the present packet is a non-critical packet.

An exemplary method according to the disclosure of selectively transmitting packets representing audio in a wireless communication network includes: providing data packets representing audio of one side of a multi-sided communication between devices in the communication network, the data packets including first data packets representing critical audio and second data packets representing non-critical audio; determining whether to transmit a third data packet during a time in the conversation occupied by one of the second data packets based on a desired timing of transmissions; transmitting the third data packet when the desired timing of transmissions is met; and transmitting the first data packets.

Embodiments of such a method may include one or more of the following features. The third data packet is a second data packet representing actual audio of the conversation. The method further includes generating the third data packet. The third data packet is one of: all zeros, all ones, a newly-generated silence descriptor, a repeat of a previously-generated silence descriptor, a repeat of a previously transmitted background packet. Transmitting the third data packet when the desired timing of transmissions is met includes transmitting the third data packet when the third packet is a $P^{th}$ packet as determined using a counter. The method further includes wirelessly receiving a periodicity value P and using the value P to determine whether the third packet is a $P^{th}$ packet. Transmitting the third data packet when the desired timing of transmissions is met comprises transmitting the third data packet when a predetermined number of times occupied by the second data packets is reached since the transmission of another third data packet or the transmission of one of the first data packets. The method further includes providing an indication of whether a present data packet of the communication is a first data packet or a second data packet.

An exemplary computer program product according to the disclosure resides on a processor-readable medium and includes processor-readable instructions configured to cause a processor to: provide data packets representing audio of one side of a multi-sided communication between devices in the communication network, the data packets including first data packets representing critical audio and second data packets representing non-critical audio; determine whether to transmit a third data packet during a time in the conversation occupied by one of the second data packets based on a desired timing of transmissions; transmit the third data packet when the desired timing of transmissions is met; and transmit the first data packets.

Embodiments of such a computer program product may include one or more of the following features. The third data packet is a second data packet representing actual audio of the conversation. The computer program product further includes instructions configured to cause the processor to generate the third data packet. The generated third data packet is one of: all zeros, all ones, a newly-generated silence descriptor, a repeat of a previously-generated silence descriptor, a repeat of a previously transmitted background packet. The instructions configured to cause the processor to transmit the third data packet when the desired timing of transmissions is met are configured to cause the processor to use a counter to determine $P^{th}$ packets of the communication and to transmit the third data packet when the third packet is a $P^{th}$ packet. The instructions configured to cause the processor to transmit the third data packet when the desired timing of transmissions is met are configured to cause the processor to transmit the third data packet when a predetermined number of times occupied by the second data packets is reached since the transmission of another third data packet or the transmission of one of the first data packets. The computer program product further includes instructions configured to cause the processor to provide an indication of whether a present data packet of the communication is a first data packet or a second data packet.

Items and/or techniques described herein may provide one or more of the following capabilities. Transmissions from wireless devices, and corresponding power consumption and interference production, can be reduced while maintaining natural sound of conversations and meeting desired/required timing of transmissions. Discontinuous wireless transmissions can be employed with reduced waste of resources, short (or no) recovery time resulting from lost background sound packets, and without introduction of extra modem logics. While item/technique-effect pairs have been described, it may be possible for a noted effect to be achieved by means other than those noted, and a noted item/technique may not necessarily yield the noted effect.

BRIEF DESCRIPTION OF THE DRAWINGS

FIGS. 6A-6E are diagrams of sequences of audio frames/packets indicating types of packets and whether the packets are transmitted.

In the figures, components with similar relevant characteristics and/or features may have the same reference label.

DETAILED DESCRIPTION

Techniques described herein provide mechanisms for providing discontinuous transmissions in a wireless network. For example, a speech encoder in a base transceiver station or an access terminal encodes audio segments, typically 20 ms segments. The encoder provides an indication of whether each packet represents critical or non-critical audio. A modem receives the packets and the critical/non-critical indications. The modem transmits each of the critical packets and transmits only those non-critical packets that the modem determines to transmit in order to meet one or more network criteria, e.g., maximum period without a transmission. Other embodiments are within the scope of the disclosure and claims.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95 and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Figure 1:
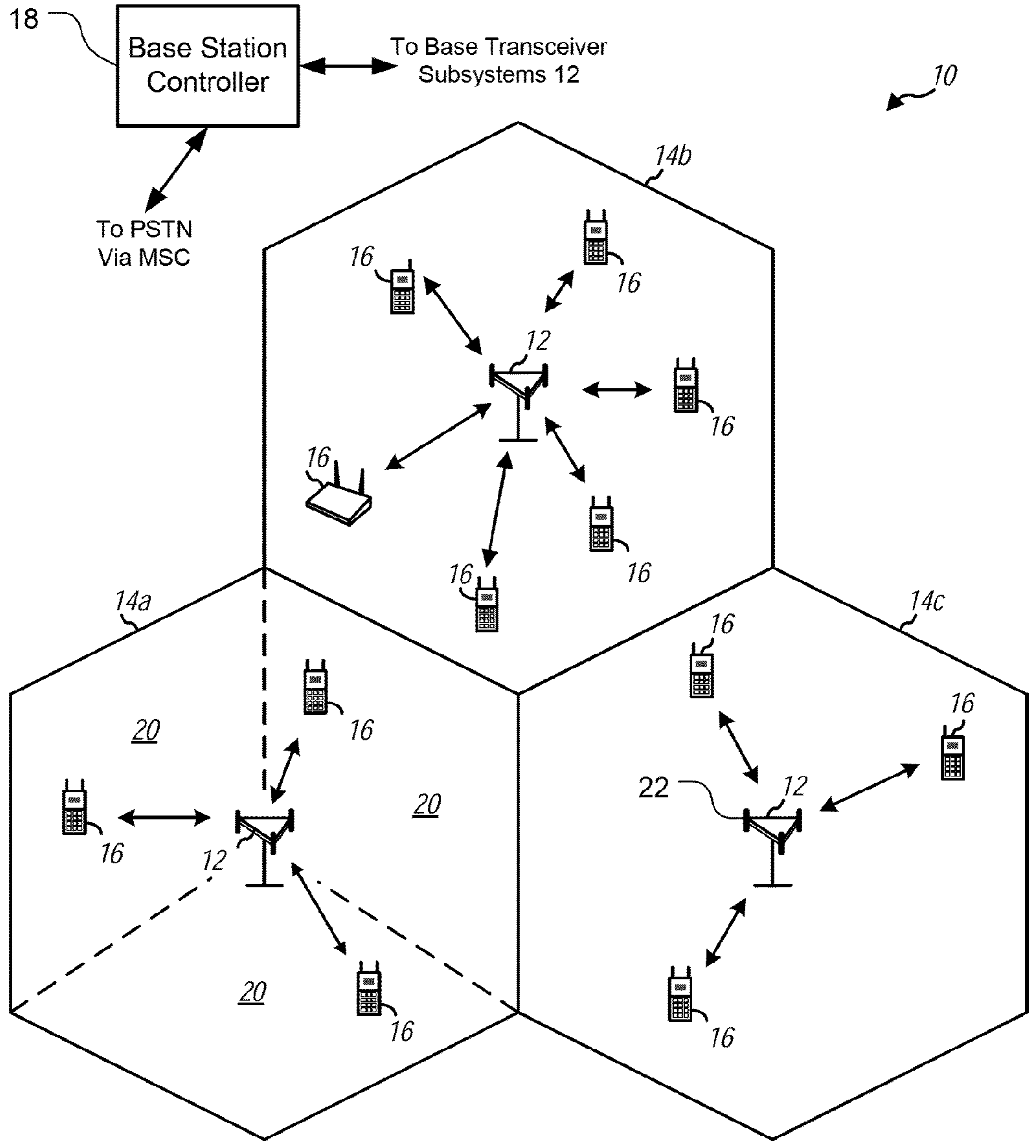
FIG. 1 is a simplified diagram of a wireless communication system, including a base station controller, base stations, and access terminals.

Referring to FIG. 1, a wireless communication system 10 includes base transceiver stations (BTSs) 12, disposed in cells 14, mobile access terminals 16 (ATs), and a base station controller (BSC) 18. The BTSs 12 and ATs 16 communicate via modulated signals. Each modulated signal may be a CDMA signal, a TDMA signal, an OFDMA signal, a SC-FDMA signal, etc. Each modulated signal may carry pilot, overhead information, data, etc.

The BTSs 12 can wirelessly communicate with the terminals 16 via antennas 22. The BTS 12 may also be referred to as an access point, an access node (AN), a Node B, an evolved Node B (eNB), etc. The BTSs 12 are configured to communicate with the ATs 16 under the control of the BSC 18. While a BSC 18 is shown, and is separate from the BTSs 12, other configurations are possible (e.g., the controller for a Node B is known as a radio network controller (RNC), and an eNB contains both transceiver and controller, i.e., both BTS and BSC functionality). Each of the base stations 12 can provide communication coverage for a respective geographic area, here the cell 14*a*, 14*b*, or 14*c*. Each of the cells 14 of the base stations 12 is partitioned into multiple (here three) sectors 20 (as shown in cell 14*a*) as a function of the base station antenna 22. While FIG. 1 shows the sectors 20 as being sharply defined, with the ATs being in only one sector 20 each, the sectors 20 overlap and a single AT 16 can be in multiple sectors 20 and multiple cells 14 simultaneously such that the BTSs 12 can communicate with the AT 16 through more than one sector 20 and more than one cell 14.

The system 10 may include only macro base stations 12 or it can have base stations 12 of different types, e.g., macro, pico, and/or femto base stations. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The ATs 16 can be dispersed throughout the cells 14. The ATs 16 may be referred to as mobile stations, mobile devices, user equipment (UE), or subscriber units. The ATs 16 here include cellular phones and a wireless communication device, but can also include personal digital assistants (PDAs), other handheld devices, netbooks, notebook computers, etc.

Figure 2:
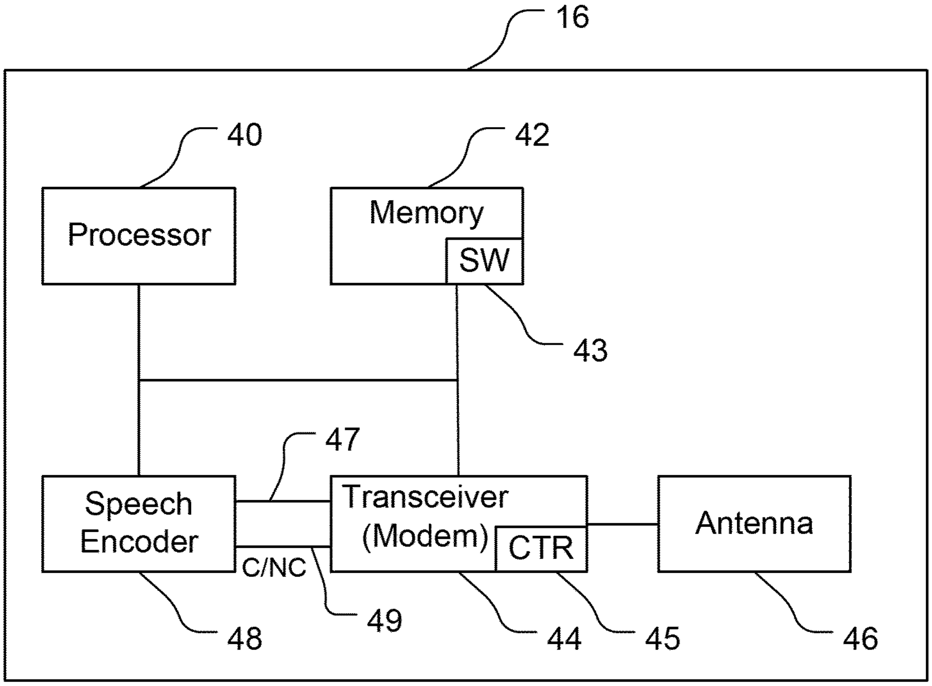
FIG. 2 is a block diagram of components of an access terminal shown in FIG. 1.

Referring also to FIG. 2, an exemplary one of the ATs 16 comprises a processor 40, memory 42, a transceiver 44, an antenna 46, and a speech encoder 48. The transceiver 44 is configured to communicate bi-directionally with the BTS 12. The processor 40 is preferably an intelligent hardware device, e.g., a central processing unit (CPU) such as those made by Intel® Corporation or AMD®, a microcontroller, an application specific integrated circuit (ASIC), etc. The memory 42 includes random access memory (RAM) and read-only memory (ROM). The memory 42 stores computer-readable, computer-executable software code 43 containing instructions that are configured to, when executed, cause the processor 40 to perform various functions described herein. Alternatively, the software 43 may not be directly executable by the processor 40 but is configured to cause the computer, e.g., when compiled and executed, to perform the functions.

The speech encoder 48 is configured to receive audio via a microphone, convert the audio into packets (e.g., 20 ms in length) representative of the received audio, and provide the audio packets to the transceiver 44 on a line 47 and to provide indications of critical/non-critical (C/NC) audio on a line 49 (discussed further below). The use of the two lines 47, 49, here and in the discussion below is for logical/illustrative purposes, as the C/NC indications may not be provided on a physically separate line or by a separate module. For example, the C/NC indications may be provided as a tag in each of the audio packets provided on the line 47. Alternatively, the encoder 48 may only provide critical packets to the transceiver 44, with the provision or withholding/suppression of the packet itself being the critical/non-critical indication.

The transceiver 44 includes a modem and is configured to modulate the packets and provide the modulated packets to the antenna 46 for transmission, and demodulate packets received from the antenna 46. The transceiver 44 also includes a modem counter 45 that counts the packets processed by the transceiver 44. The counter 45 counts the received packets and/or packet/frame times independently of the speech encoder 48. That is, the counter 45 can count received packets, or count packet/frame times (e.g., incrementing every 10 ms, or 20 ms, etc.) in the absence of received packets, or count both received packets and packet/frame times in the absence of received packets. The counter 45 may be configured to count sequentially or to count in a cyclic manner based on a periodicity value.

The ATs 16 can communicate with the base stations 12 via forward and reverse links using an active set of carriers. The forward link (or downlink) refers to the communication link from the base station 12 to the terminal 16, and the reverse link (or uplink) refers to the communication link from the terminal 16 to the base station 12. The active set of carriers is the set of carriers for which communication with a base station 12 has been determined to be possible to a satisfactory degree. The active set can include sector-carrier pairs (pilots) corresponding to the base stations 12 that will decode transmissions from the AT 16 on the uplink and which can be selected by the AT 16 to receive downlink transmissions.

Figure 3:
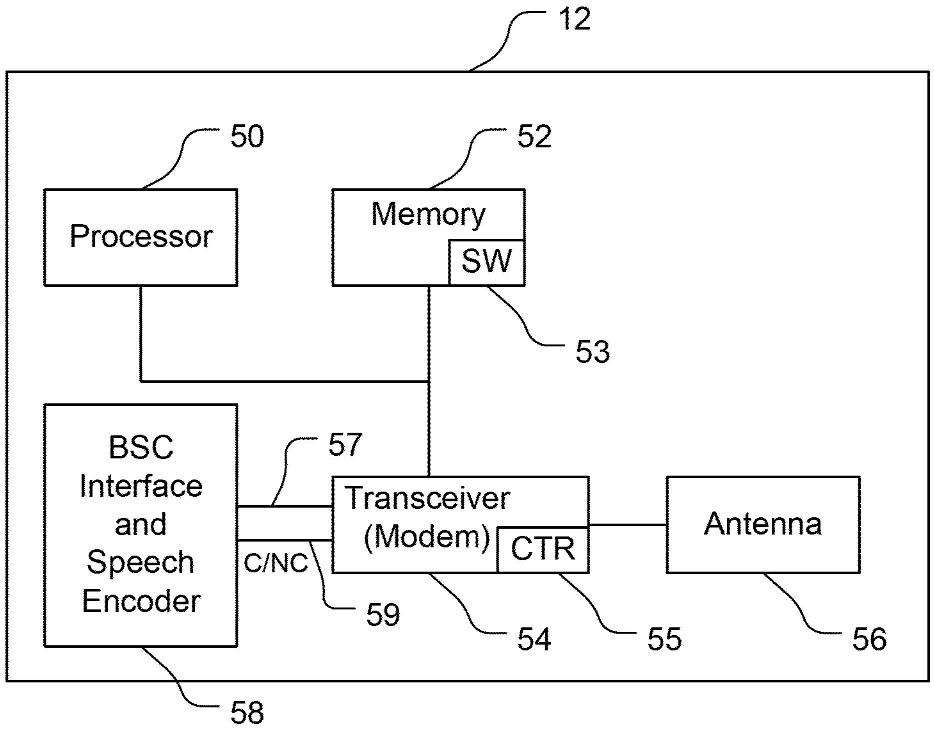
FIG. 3 is a block diagram of components of a base transceiver station shown in FIG. 1.

Referring also to FIG. 3, an exemplary one of the BTSs 12 includes a processor 50, memory 52, a modem 54, an antenna 56, and a BSC interface and speech encoder 58. While shown as part of the BTS 12, the speech encoder 58 may be physically disposed elsewhere, e.g., in the BSC 18 or a media gateway (not shown). The transceiver 54 is configured to communicate bi-directionally with the ATs 16, e.g., by modulating outgoing packets of information received from the BSC interface 58 and providing the modulated packets to the antenna 56 for transmission to the ATs 16, and by demodulating packets of information received from the antenna 56 and providing the demodulated packets to the BSC interface 58. The processor 50 is preferably an intelligent hardware device, e.g., a central processing unit (CPU) such as those made by Intel® Corporation or AMD®, a microcontroller, an application specific integrated circuit (ASIC), etc. The memory 52 includes random access memory (RAM) and read-only memory (ROM). The memory 52 stores computer-readable, computer-executable software code 53 containing instructions that are configured to, when executed, cause the processor 50 to perform various functions described herein. Alternatively, the software 53 may not be directly executable by the processor 50 but is configured to cause the computer, e.g., when compiled and executed, to perform the functions.

The BTS 12 is connected and configured for bi-directional communication with the BSC 18. Typically, as here, the BSC 18 is hardwired to the BTSs 12. The BTS 12 is configured to convey, receive, encode, and decode transmissions to and from the BSC 18 using the transceiver 54 via the BSC interface 58.

The BSC interface and speech encoder 58 is configured to receive audio packets from the network and provide the packets to the transceiver 54 on a line 57 and to provide indications of critical/non-critical audio on a line 59 (discussed further below). The received packets may be encoded packets that are conveyed by the interface/encoder 58 but not encoded by the interface/encoder 58. Alternatively, the interface/encoder 58 can encode audio packets and provide these packets on the line 57 and the critical/non-critical indications on the line 59. The use of the two lines 57, 59, here and in the discussion below is for logical/illustrative purposes, as the C/NC indications may not be provided on a physically separate line or by a separate module. For example, the C/NC indications may be provided as a tag in each of the audio packets provided on the line 57. Alternatively, the interface/encoder 58 may only provide critical packets to the transceiver 54, with the provision or withholding/suppression of the packet itself being the critical/non-critical indication.

The transceiver 54 includes a modem that is configured to modulate the packets and provide the modulated packets to the antenna 56 for transmission and demodulate packets received from the antenna 56. The transceiver 54 also includes a modem counter 55 that counts the packets processed by the transceiver 54. The counter 55 counts the received packets and/or packet/frame times independently of the interface/encoder 58. That is, the counter 55 can count received packets, or count packet/frame times (e.g., incrementing every 10 ms, or 20 ms, etc.) in the absence of received packets, or count both received packets and packet/frame times in the absence of received packets. The counter 55 may be configured to count sequentially or to count in a cyclic manner based on a periodicity value.

The traffic between the ATs 16 and the BTSs 12 changes dynamically. As conversations occur over the network 10 and the traffic for those conversations passes between the BTSs 12 and the ATs 16, the packets of that traffic sent between the BTSs 12 and the ATs 16 varies with the conversations. The traffic patterns typically include active speech followed by critical background noise followed by periods of non-critical background noise interspersed with critical background noise before more active speech.

Figure 4:
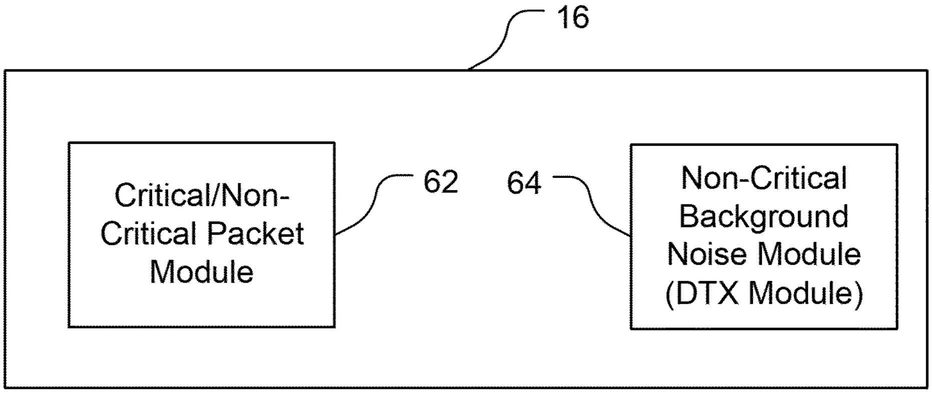
FIG. 4 is a block diagram of functional components of the access terminal shown in FIG. 2.

Referring to FIG. 4, with further reference to FIG. 2, the AT 16 includes a critical/non-critical (C/NC) packet module 62 and a non-critical background noise module (DTX module) 64. The C/NC module 62 is preferably part of the speech encoder 48 although it could be implemented distinct from the encoder 48. The C/NC module 62 is configured to determine whether packets are for critical audio (e.g., active speech or critical background noise) or non-critical audio (e.g., non-critical background noise) and provide indications on the line 49 as to whether corresponding packets of audio on the line 47 are critical or non-critical. The DTX module 64 is preferably, although not necessarily, part of the transceiver 44. The DTX module 64 is configured to determine whether or not to transmit a packet received on the line 47 that is designated as non-critical by an indication on the line 49. The DTX module 64 is configured to make this determination based on a periodicity value P (e.g., 4, 8, etc.) received from the BTS 12 and a position of a present packet in a sequence of packets relative to where the modem began tracking (e.g., counting) the packets (e.g., based on a packet number of the present packet in the sequence of packets of a conversation/communication). Alternatively, the module 64 could be configured to make this determination based on the periodicity and a quantity of packets since a last packet transmission. The speech encoder 48 and the transceiver 44 are thus an encoding and modulating unit configured to encode audio (e.g., speech) into packets, determine whether the encoded packets are critical or non-critical, determine whether to transmit non-critical packets, blank the non-critical packets that are not to be transmitted, and modulate the encoded packets that are to be transmitted (critical packets and non-critical packets determined to be transmitted) for transmission by the antenna 46.

Figure 5:
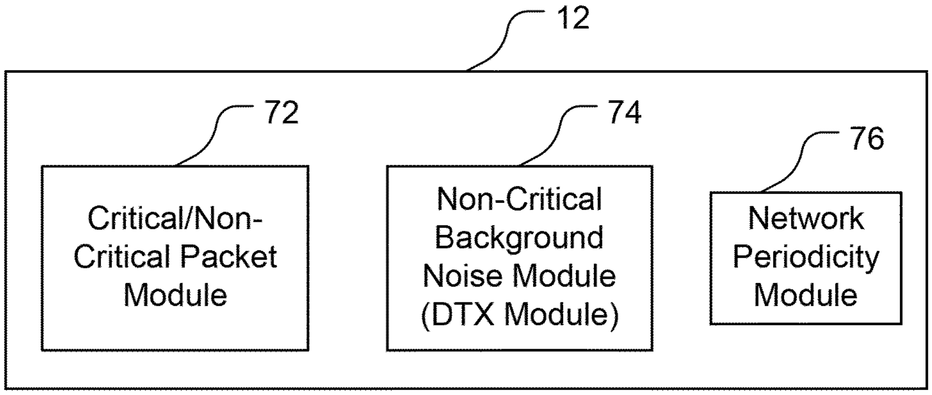
FIG. 5 is a block diagram of functional components of the base transceiver station shown in FIG. 3.

Referring to FIG. 5, with further reference to FIG. 3, the BTS 12 includes a critical/non-critical (C/NC) packet module 72, a non-critical background noise module (DTX module) 74, and a network periodicity module 76. The C/NC module 72 is preferably part of the speech encoder 58 although it could be implemented distinct from the speech encoder 58. The C/NC module 72 is configured to determine whether packets are indicative of critical audio (e.g., active speech or critical background noise) or non-critical audio (e.g., non-critical background noise) and provide indications on the line 59 as to whether corresponding packets of audio on the line 57 are critical or non-critical. The DTX module 74 is preferably, although not necessarily, part of the modem of the transceiver 54. The DTX module 74 is configured to determine whether or not to transmit a packet received on the line 57 that is designated as non-critical by an indication on the line 59. The DTX module 74 is configured to make this determination based on a network periodicity value P provided by the network periodicity module 76 and a position of a present packet in a sequence of packets relative to where the modem began tracking (e.g., counting) the packets (e.g., based on a packet number of the present packet in the sequence of packets of a conversation/communication). The periodicity module 76 could provide different periodicities to the DTX module 74 versus the DTX module 64. The speech encoder 58 and the transceiver 54 are thus an encoding and modulating unit configured to encode audio (e.g., speech) into packets, determine whether the encoded packets are critical or non-critical, determine whether to transmit non-critical packets, blank the non-critical packets that are not to be transmitted, and modulate the encoded packets that are to be transmitted (critical packets and non-critical packets determined to be transmitted) for transmission by the antenna 56.

The network periodicity module 76 is configured to provide a periodicity value to the DTX module 74 of the BTS 12 and to provide the periodicity value to the DTX module 64 of the AT 16 (FIG. 4) via the antenna 56. The periodicity value is a quantity of frames that indicates an acceptable separation between transmitted frames. That is, for a periodicity value of P, critical frames are transmitted and every $P^{th}$ frame will be transmitted regardless of whether it is a critical or non-critical frame. The module 76 can change the periodicity value P over time, including during a communication between the BTS 12 and the AT 16.

FIG. 6A shows an example of a packet sequence 110 generated with a speech coder with a source-controlled DTX scheme. As is typical, the sequence 110 includes several active speech (A) packets 112, followed by a critical background noise ($E_C$) packet 114, followed by non-critical background noise (B) packets 116 with an occasional critical background noise packet 114 interspersed in the non-critical background noise packets 116. The packet numbers shown in FIGS. 6A-6E are for ease of illustration and are not limiting.

For purposes of lowest power consumption and smallest interference impact, packets would be transmitted only when the input segment is either active speech or critical background noise. Referring also to FIG. 6B, given the speech encoder packet sequence of FIG. 6A, a transmitted packet sequence 120 includes transmitted (T) packets 122 corresponding to the active speech packets 112 and the critical background noise packets 114, and untransmitted packets (X) 124, i.e., for any of the non-critical background noise packets 116.

For proper functioning of a modem (e.g., to maintain power control, or other feedback loop between transmitter and receiver), however, the modem might need to transmit periodically. For example, the modem 44, 54 may preferably transmit at least once every P segments, with $P \geqq 1$ depending on channel characteristics. Perfectly aligning the modem's desired transmit timing with the speech encoder generated packet sequence in the background noise period is very difficult, if not impossible. Referring also to FIG. 6C, a desired transmitted packet sequence 130 with P=4 includes transmitted (T, D) packets 132, 133 and untransmitted packets (X) 134. The T packets 132 are packets of active speech and critical background noise while the D packets 133 are packets transmitted during non-critical background noise segments where the speech encoder 48 or interface/encoder 58 blanked a packet, i.e., withheld/suppressed transmission to the transceiver 44, 54. The D packets are "dummy" packets of artificially-generated data, e.g., all zeros, all ones, a newly-generated silence descriptor (SID), a repeat of the last transmitted (previously-generated) SID, or a repeat of the last transmitted background noise packet, etc. produced/generated by the transceiver 44. Thus, the modem 44, 54 could be allowed to perform DTX in the background noise period without input as to the type of data provided by the speech encoder. Alternatively, the transceiver 44 can perform DTX using critical/non-critical indications from the vocoder 48 along with all audio packets, as discussed below.

Figure 7:
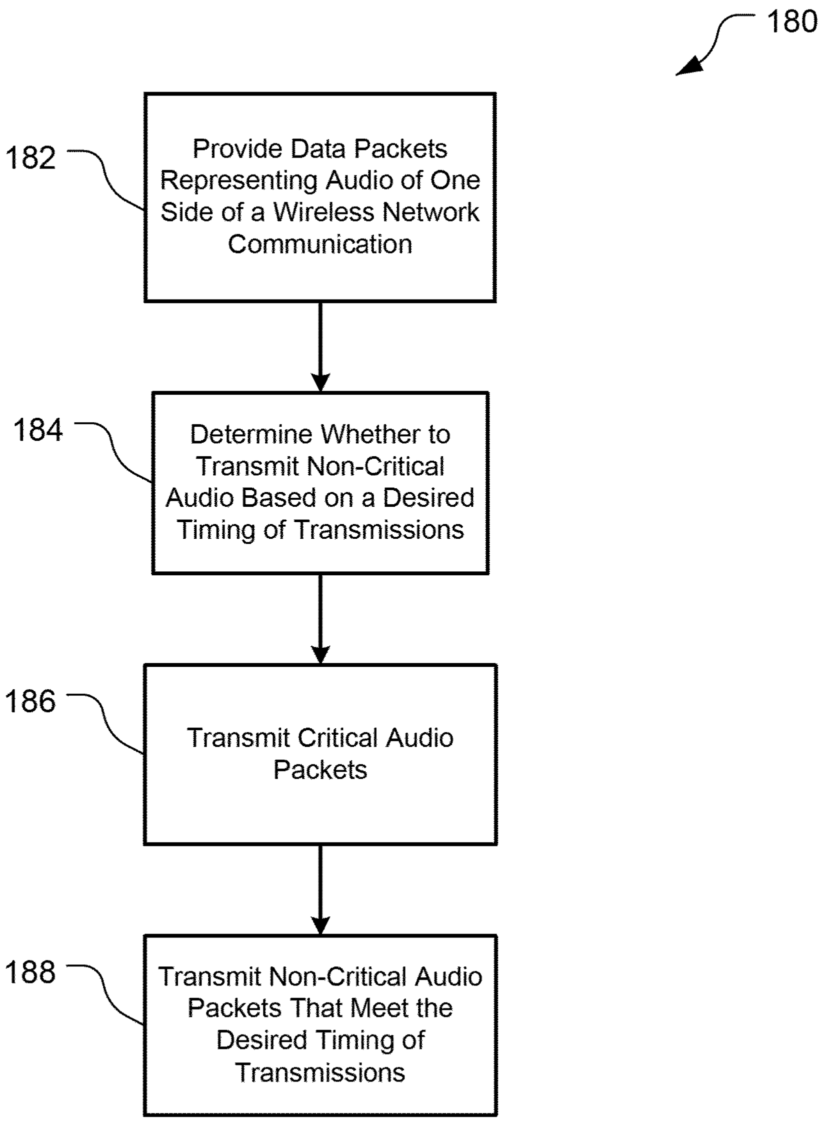
FIG. 7 is block flow diagram of a process of discontinuously transmitting non-critical audio.

Referring to FIG. 7, a process 180 of transmitting critical audio and discontinuously transmitting non-critical audio (e.g., background noise) includes the stages shown. In the process 180, a speech encoder in a base transceiver station or an access terminal encodes/receives audio segments and provides an indication of whether each packet represents critical or non-critical audio. A modem receives the packets and the critical/non-critical indications. The modem transmits each of the critical packets and transmits only those non-critical packets that the modem determines to transmit in order to meet one or more network criteria, e.g., maximum period without a transmission. The process 180 is exemplary only, and not limiting. The process 180 may be altered, e.g., by having stages added, removed, or rearranged. At stage 182, a sequence of data packets is produced representing audio of one side of a multi-sided (e.g., two-sided, three-sided, etc.) communication in the network 10. At stage 184, it is determined whether to transmit non-critical audio packets based on a desired timing of transmission, e.g., a threshold quantity of time slots that can be passed without transmission, as indicated by a periodicity value. At stage 186, the critical-audio packets are transmitted. At stage 188, only those non-critical audio packets are transmitted that meet the desired timing of transmission criterion.

Figure 8:
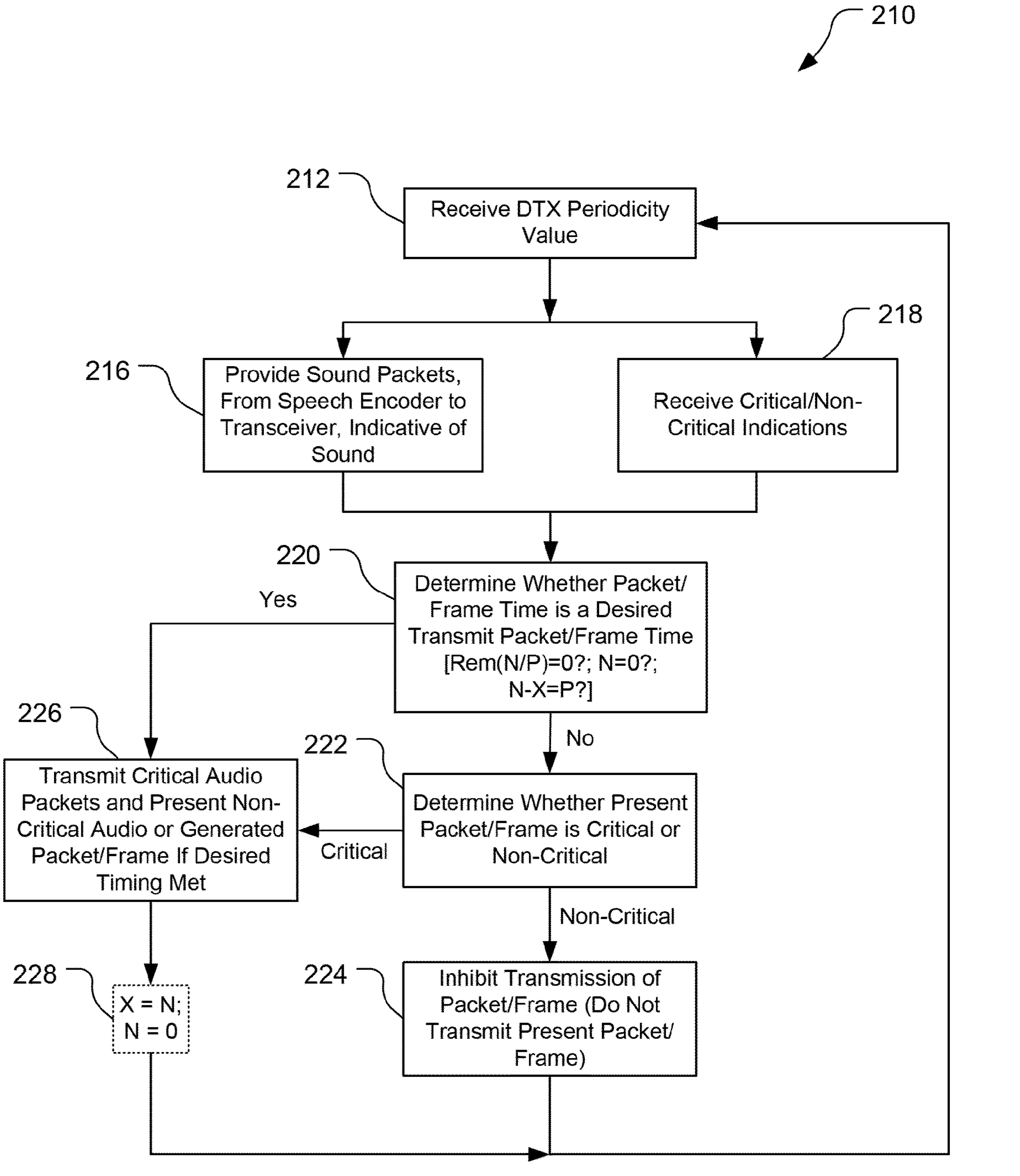
FIG. 8 is block flow diagram of an exemplary implementation of the process shown in FIG. 7.

Referring to FIG. 8, with further reference to FIGS. 1-5, 6C, and 6D, a process 210 of transmitting critical audio and discontinuously transmitting non-critical audio (e.g., background noise) includes the stages shown. The process 210 is an exemplary implementation of the process 180 shown in FIG. 7, and is not limiting. The process 210 may be altered, e.g., by having stages added, removed, or rearranged. For example, while the process 210 is applicable to multiple BTSs 12 and multiple ATs 16, the description below references one BTS 12 and one AT 16. Further, while the techniques described are applicable to both the BTS 12 and the AT 16, the description below only describes DTX communications from the AT 16, with the functionality of the BTS 12 being similar. As another example, stages 220 and 222 discussed below could be reversed. As still another example, stage 220 could be modified and stage 228 inserted as discussed below.

At stage 212, a DTX periodicity value is received. The network periodicity module 76 of the BTS 12 provides the periodicity value, P, to the non-critical background noise modules 64, 74 of the AT 16 and the BTS 12. For the AT 16, the periodicity value is transmitted/sent via the transceiver 54 and the antenna 56 of the BTS 12 and received by the antenna 46 and transceiver 44 of the AT 16. This stage may be performed well before the inception of an information exchange (e.g., a phone call) involving the BTS 12 and the AT 16. The periodicity value may be changed over time, and the value, whether changed or not, may be transmitted to the AT 16 periodically, e.g., daily.

At stage 216, sound signals are received by the transceiver (modem) 44 from the speech encoder 48 indicative of sound. The speech encoder 48 provides signals to the transceiver 44 on the line 47 indicative of sound received at the AT 16, e.g., voice, background noise. The sound signals provide running/ongoing indications of sound at the AT 16 regardless of the nature of those sounds, be them voice, critical non-voice/background noise (i.e., sounds that are not voice but desirable to transmit), or non-critical background noise. The non-critical background noises may be desirable to transmit, e.g., to help the information appear complete even if less than all available information is provided (e.g., to help a conversation sound normal, without unusual silence). The transceiver formats the received sound signals into a sequence of data packets (frames) each representing, e.g., 20 ms of sound. The packets are numbered sequentially for each interaction between the AT 16 and the BTS 12. That is, for each connection/interaction, e.g., a phone call, between the AT 16 and the BTS 12, the packets are sequentially numbered starting fresh for each new connection/interaction. Alternatively, the packets can be numbered non-sequentially, e.g., in a cyclic manner based on the value of P (e.g., for a P value of 4, the packets can be numbered 0, 1, 2, 3, 0, 1, 2, 3, 0, etc.). The packet numbering described is provided for conceptual understanding, and is not limiting. The numbering mechanisms shown, or other techniques, may be used to ensure that every $P^{th}$ packet is transmitted or that no more than P−1 frames of time passes before a packet is transmitted.

At stage 218, critical/non-critical (C/NC) signals are received from the speech encoder 48 indicative of a critical or non-critical nature of the corresponding sound signals. The speech encoder 48 provides the C/NC signals on the line 49 indicating the nature of the corresponding signals provided on the line 47 as representing either critical sound, e.g., active speech or critical background noise, or non-critical sound. The transmission to, or withholding/suppression of a packet from, the transceiver 44 at stage 216 may be the critical/non-critical indication.

At stage 220, an inquiry is made as to whether the present packet or frame of sound information, or frame time, is an automatic or mandatory-transmit packet (FIG. 6D) or time (FIG. 6C), i.e., that it is irrelevant whether the present packet is critical or non-critical (FIG. 6D), or that no packet is provided to the transceiver 44 (FIG. 6C). The modem in the transceiver 44 checks whether the present received packet (FIG. 6D) or a generated packet (FIG. 6C) is to be transmitted, regardless of the critical/non-critical nature of the received packet and regardless of the C/NC signal value, or the absence of a received packet, based on whether one or more periodicity criteria are met, here based on the periodicity value and other relevant information. Here, the transceiver 44 determines whether a timing for automatic/mandatory transmissions has been met by determining whether the present packet or frame time corresponds to a $P^{th}$ packet or frame time. The transceiver 44 determines a remainder of dividing the present packet/frame number from the counter 45 by the periodicity value, e.g., four, is zero (i.e., REM((packet number)/(periodicity value)=0? or REM(N/P)=0?). Alternatively, if the counter 45 counts cyclically, then the transceiver 44 determines whether the counter 45 is at a value, e.g., 0 (N=0?), indicating that the period for automatic transmission is reached. If the period between automatic/mandatory transmissions is met, then the periodicity test is met (e.g., the remainder is zero, the counter value is 0, etc.), and, the present packet having been determined to be an automatic/mandatory packet for transmission, the process proceeds to stage 226. If the period between automatic/mandatory transmissions is not met, then the periodicity criterion is not met (e.g., remainder is non-zero, counter value is non-zero, etc.), and the process proceeds to stage 222.

At stage 222, an inquiry is made as to whether the present received packet is classified as being critical or non-critical. In the configuration where C/NC signals are provided, the transceiver 44 analyzes the C/NC signal on the line 49 corresponding to present packet produced from the sound signal on line 47 and determines whether the C/NC signal indicates that the present packet represents critical sound or non-critical sound. If the packet itself is the critical indication, then a received packet is determined to be critical. If the packet is determined to represent critical sound, i.e., to be a critical packet, then the process 210 proceeds to stage 226. If the packet is determined to represent non-critical sound, i.e., to be a non-critical packet, or no packet is received, then the process 210 proceeds to stage 224.

At stage 224, a present received packet, if one exists, is inhibited from being transmitted by the antenna (not transmitted). Either no action can be taken or the present packet can be discarded. The transceiver 44 preferably discards the present packet so that no packet is transmitted in the present time slot of the interaction between the AT 16 and the BTS 12. Alternatively, the transceiver does not discard the packet, but does not convey it to the antenna 46, and then replaces the packet with the next packet in the sequence. The process 210 then returns to stage 212.

At stage 226, a present received packet (FIG. 6D) is transmitted, or a dummy packet is generated and transmitted (FIG. 6C). If there is a received packet, the present received packet is transmitted by the transceiver 44 via the antenna 46 toward the BTS 12. The packet that is transmitted represents the sound received at the AT 16 as represented by the sound signals from the speech encoder 48 on the line 47 and formatted into the packet by the modem of the transceiver 44. The data transmitted thus represents the actual sound for that instant in time and not dummy data or a silence indicator or a repetition of a previous sound or silence indicator. If there is no received packet, but a packet is to be transmitted, then the transceiver 44 generates a packet (e.g., all zeros, all ones, a repeat of the last-transmitted background packet, a silence descriptor, or a repeat of the last silence descriptor transmitted), and the packet is transmitted by the transceiver 44 and the antenna 46.

The process 210 returns to stage 212 for further processing. A new periodicity value may or may not be received at stage 212. Sounds and indications of critical/non-critical nature of the sounds continue to be received at stages 216, 218 and the sounds formatted into packets. The process 210 continues until the present interaction between the AT 16 and the BTS 12 ends, and the process 210 will start again with a new interaction. A new periodicity value, however, may not be received at stage 212 for each new interaction if one is already stored (e.g., a default value or a previously-received value).

Referring to FIG. 6C, the sequence 130 of packets has some non-critical packets generated and transmitted according to the periodicity value P. FIG. 6C is for the exemplary case where P=4. As shown, six packets 132 are transmitted that are either active speech or critical background noise. Three generated dummy packets 133 with packet numbers in $P^{th}$ locations in the sequence 130 are also transmitted. No packets are transmitted during background noise times 134 not at the periodic times.

Referring to FIG. 6D, a sequence 140 of packets has some non-critical packets transmitted according to the periodicity value P. FIG. 6D is for the exemplary case where P=4. As shown, four active-speech packets 142 are transmitted and two critical background-noise packets 144 are transmitted. Additionally, non-critical background noise packets 146 with packet numbers divisible by four without remainder (here packet numbers 8, 12, and 16) are also transmitted.

As an alternative, stages 220 and 222 could be exchanged. Thus, it could be determined first whether a packet is critical or non-critical. If the packet is critical, then it would be transmitted at stage 226. If the packet is non-critical, then it would be determined whether the packet should be transmitted in accordance with the periodicity of automatic transmissions (i.e., where it is irrelevant whether the packet is critical or non-critical).

As a further alternative, the periodicity may be used to ensure not that every $P^{th}$ packet is transmitted, but that no more than P−1 non-critical packets in a row are inhibited from transmission by the antenna 46. In this case, after a packet (critical or not) is transmitted at stage 226, the process 210 proceeds to a stage 228 (shown in dashed line in FIG. 8) where the present packet number is stored as a last-transmitted packet number, X (i.e., X=N), or a cyclic counter is reset to its beginning, e.g., zero (N=0). In this arrangement, at stage 220, instead of determining whether the present packet number is a multiple of the periodicity value P, an inquiry is made as to whether the present packet is P packets from the last-transmitted packet, i.e., does N−X=P? (or does N=0? for a cyclic counter). If it is determined that the timing criterion is met (e.g., N−X=P for a non-cyclic counter or N=0 for a cyclic counter), then the process 210 proceeds to stage 226 and otherwise proceeds to stage 222. Referring to FIG. 6E, a sequence 150 of packets has non-critical packets transmitted only where three un-transmitted packet time slots preceded the respective transmitted non-critical packet. FIG. 6E is for the exemplary case where P=4. As shown, four active-speech packets 152 are transmitted and two critical background-noise packets 154 are transmitted. Additionally, a non-critical background noise packet 156 is only transmitted if its packet number minus the packet number of the most-recently transmitted packet equals four. Here, because packet number 5 is followed by eight non-critical packets, packet number 8 (8−4=4) is transmitted. Packet number 8 then becomes the most-recently transmitted packet and thus the next transmitted packet is packet number 12 (12−8=4). Packet number 13 is a critical packet, is thus transmitted, becomes the most-recently transmitted packet, and is followed by five non-critical packets. Therefore, the next transmitted packet is packet number 17 (17−13=4).

In yet another alternative, the inquiries of both of the stages 220 and 222 are made by the speech encoder 48. The encoder 48 determines both whether the present packet is critical or non-critical and whether the present packet should be transmitted in accordance with the desired periodicity of transmitted packets. In this case, the speech encoder does not convey a C/NC signal to the transceiver 44, and instead transmits to the transceiver 44 only packets to be conveyed to and transmitted by the antenna 46. The packets transmitted by the encoder 48 to the transceiver 44 may be either critical or non-critical packets, and the transceiver modulates and conveys the packets to the antenna 46 regardless of their nature, and preferably without making a determination as to their nature.

Other embodiments are possible and within the scope of the disclosure.

In an alternative arrangement, the DTX module 74 could be configured to make the determination whether or not to transmit a packet received on the line 57 that is designated as non-critical by an indication on the line 59 based on the periodicity and a quantity of packets since a last packet transmission. That is, the periodicity value indicates a quantity of frames that should not be exceeded without transmitting a packet. Thus, for a periodicity value of P, if P−1 frames have had no packet transmitted, then the next frame should have a packet transmitted.

While the periodicity discussed above effected no longer than fixed periods between mandatory transmissions, this is not the only meaning of periodicity. The periodicity sets an upper limit between packet/frame transmissions, but the transmissions during long periods of non-critical background noise may not be only at fixed intervals. The transmissions may be random, at fixed intervals, semi-random, etc. but with an upper limit between any two transmissions.

What is claimed is:

1. A communication system for use in a wireless network, the system comprising:

an audio module configured to provide packets indicative of audio for a part of a communication between the communication system and another communication system, the communication spanning packet times, the packets including at least critical packets indicative of critical audio; and a transceiver coupled to the audio module and configured to cause:

the critical packets to be conveyed for transmission; and first non-critical packets, indicative of non-critical audio, to be conveyed for transmission such that (1) the first non-critical packets represent less than all of a time between transmission of critical packets and (2) no more than a threshold number of packet times will pass without one of the critical packets or one of the first non-critical packets being conveyed by the transceiver for transmission.

2. The system of claim 1 wherein the audio module is configured to provide the first non-critical packets to the transceiver, and wherein the first non-critical packets represent actual audio of the communication between the communication system and the another communication system.

3. The system of claim 2 wherein the audio module is configured to provide the critical packets, the first non-critical packets, and second non-critical packets, indicative of non-critical audio, and the transceiver is configured to inhibit the second non-critical packets from transmission.

4. The system of claim 1 wherein the audio module is configured to provide an indication of whether a provided packet represents critical or non-critical audio.

5. The system of claim 1 wherein the audio module is configured to provide to the transceiver only the critical packets and the first non-critical packets.

6. The system of claim 1 wherein the audio module is configured to provide only the critical packets to the transceiver and the transceiver is configured to generate the first non-critical packets.

7. The system of claim 1 wherein the transceiver is configured to ensure that every $P^{th}$ packet in the communication is conveyed for transmission.

8. The system of claim 7 wherein the transceiver is configured to determine whether a present packet is a $P^{th}$ packet of the communication only if the present packet is a non-critical packet.

9. A communication system for use in a wireless network, the system comprising:

an audio module configured to provide packets indicative of audio for a part of a communication between the communication system and another communication system, the communication spanning communication packet times, the packets including at least critical packets indicative of critical audio; and transmitting means coupled to the audio module for transmitting:

the critical packets; and first non-critical packets, indicative of non-critical audio, such that (1) the first non-critical packets represent less than all of a time between transmission of critical packets and (2) no more than a threshold number of packet times will pass without one of the critical packets or one of the first non-critical packets being conveyed by the transceiver for transmission.

10. The system of claim 9 wherein the audio module is configured to provide the first non-critical packets to the transceiver, and wherein the first non-critical packets represent actual audio of the communication between the communication system and the another communication system.

11. The system of claim 10 wherein the audio module is configured to provide the critical packets, the first non-critical packets, and second non-critical packets, indicative of non-critical audio, and the transceiver is configured to inhibit the second non-critical packets from transmission.

12. The system of claim 9 wherein the audio module is configured to provide an indication of whether a provided packet represents critical or non-critical audio.

13. The system of claim 9 wherein the audio module is configured to provide to the transceiver only the critical packets and the first non-critical packets.

14. The system of claim 9 wherein the audio module is configured to provide only the critical packets to the transceiver and the transceiver is configured to generate the first non-critical packets.

15. The system of claim 9 wherein the transmitting means is further for ensuring that every $P^{th}$ packet in the communication is conveyed for transmission.

16. The system of claim 15 wherein the transmitting means is configured to determine whether a present packet is a $P^{th}$ packet of the communication only if the present packet is a non-critical packet.

17. A method of selectively transmitting packets representing audio in a wireless communication network, the method comprising:

- providing data packets representing audio of one side of a multi-sided communication between devices in the communication network, the data packets including first data packets representing critical audio and second data packets representing non-critical audio;
- determining whether to transmit a third data packet during a time in the conversation occupied by one of the second data packets based on a desired timing of transmissions relative to each other;
- transmitting the third data packet when the desired timing of transmissions is met; and
- transmitting the first data packets.

18. The method of claim 17 wherein the third data packet is a second data packet representing actual audio of the conversation.

19. The method of claim 17 further comprising generating the third data packet.

20. The method of claim 19 wherein the third data packet is one of: all zeros, all ones, a newly-generated silence descriptor, a repeat of a previously-generated silence descriptor, a repeat of a previously transmitted background packet.

21. The method of claim 17 wherein transmitting the third data packet when the desired timing of transmissions is met comprises transmitting the third data packet when the third packet is a $P^{th}$ packet as determined using a counter.

22. The method of claim 21 further comprising wirelessly receiving a periodicity value P and using the value P to determine whether the third packet is a $P^{th}$ packet.

23. The method of claim 17 wherein transmitting the third data packet when the desired timing of transmissions is met comprises transmitting the third data packet when a predetermined number of times occupied by the second data packets is reached since the transmission of another third data packet or the transmission of one of the first data packets.

24. The method of claim 17 further comprising providing an indication of whether a present data packet of the communication is a first data packet or a second data packet.

25. A computer program product residing on a non-transitory processor-readable medium and comprising processor-readable instructions configured to cause a processor to:

- provide data packets representing audio of one side of a multi-sided communication between devices in the communication network, the data packets including first data packets representing critical audio and second data packets representing non-critical audio;
- determine whether to transmit a third data packet during a time in the conversation occupied by one of the second data packets based on a desired timing of transmissions relative to each other;
- transmit the third data packet when the desired timing of transmissions is met; and
- transmit the first data packets.

26. The computer program product of claim 25 wherein the third data packet is a second data packet representing actual audio of the conversation.

27. The computer program product of claim 25 further comprising instructions configured to cause the processor to generate the third data packet.

28. The computer program product of claim 27 wherein the third data packet is one of: all zeros, all ones, a newly-generated silence descriptor, a repeat of a previously-generated silence descriptor, a repeat of a previously transmitted background packet.

29. The computer program product of claim 25 wherein the instructions configured to cause the processor to transmit the third data packet when the desired timing of transmissions is met are configured to cause the processor to use a counter to determine $P^{th}$ packets of the communication and to transmit the third data packet when the third packet is a $P^{th}$ packet.

30. The computer program product of claim 25 wherein the instructions configured to cause the processor to transmit the third data packet when the desired timing of transmissions is met are configured to cause the processor to transmit the third data packet when a predetermined number of times occupied by the second data packets is reached since the transmission of another third data packet or the transmission of one of the first data packets.

31. The computer program product of claim 25 further comprising instructions configured to cause the processor to provide an indication of whether a present data packet of the communication is a first data packet or a second data packet.

* * * * *